United States Patent [19]

Bailey

[11] Patent Number: 5,227,967
[45] Date of Patent: Jul. 13, 1993

[54] SECURITY INSTRUMENT DATA SYSTEM WITHOUT PROPERTY INAPPLICABLE NULLS

[76] Inventor: Stephen C. Bailey, 6349 Bayberry St., Agoura, Calif. 91301

[21] Appl. No.: 326,224

[22] Filed: Mar. 20, 1989

[51] Int. Cl.⁵ .............................................. G06F 15/21
[52] U.S. Cl. ................................................. 364/408
[58] Field of Search ........................ 364/401, 406, 408

[56] References Cited

PUBLICATIONS

*Database Design Methodology*, M. Vetter, 1981, pp. 86-89.
"Stock Market Portfolio Management System", James Ray, PC Magazine, vol. 6, No. 8, pp. 140-141, Feb. 1989, Microsearch AN 89-052844.
"Portfolio Decisions", Product Literature by Silver Eagle Software, Nov. 1987, Microsearch file of Orbit, AN 87-045391.

*Primary Examiner*—Gail O. Hayes
*Attorney, Agent, or Firm*—Alvin S. Blum

[57] ABSTRACT

This system and method for storage and retrieval of investment asset data in a computer system separates the data into many small files each of limited size and related to a functional attribute of the investment instrument. By storing the data in these separate files rather than all together as in the prior art, one develops a system that appears more complex, but is better suited to computer processing. It is faster, more easily programmed, less prone to error, and more readily expanded to handle diverse investment vehicles with different attributes such a unique interest formulations, discount bonds and the like without impact on previously recorded issues.

7 Claims, 10 Drawing Sheets

| Trade Date: | __/__/__ | Par Amount: | _____ |
| --- | --- | --- | --- |
| Settle Date: | __/__/__ | Price: | _____ |
| Security Type: | _____ | Cost of Par: | _____ |
| Issue Date: | __/__/__ | Int. Calc. Meth: | _____ |
| Maturity Date: | __/__/__ | Purch. Int: | _____ |
| Interest Rate: | _____ | Total Cost: | _____ |
| Next Pay Date: | __/__/__ | | |

FIGURE 1   PRIOR ART

TRANSACTION REPORT
04/01/88 - 04/18/88
ALL TRANSACTIONS

| TRN# | TRAN | TRADE | LOT# | PAR | COST | INT |
| --- | --- | --- | --- | --- | --- | --- |
| 1230 | MAT | 04/12/88 | 1192 | 2,000,000.00 | | |
| 1231 | BUY | 04/12/88 | 1231 | 2,000,000.00 | 1,980,000.00 | 11,148.12 |
| 1232 | INT | 04/15/88 | 1219 | | | 112,500.00 |
| 1233 | MAT | 04/15/88 | 1228 | 4,000,000.00 | | |
| 1234 | BUY | 04/15/88 | 1234 | 4,000,000.00 | 3,987,500.00 | |
| 1235 | MAT | 04/17/88 | 1201 | 2,000,000.00 | | 75,000.00 |
| 1236 | BUY | 04/17/88 | 1236 | 1,000,000.00 | 997,500.00 | 3,020.55 |

FIGURE 2   PRIOR ART

INVENTORY REPORT
04/18/88
SETTLEMENT DATE BASIS

| LOT# | TRADE SETTLE | TYPE | ISSUE MAT | RATE MKT PRC | PAR MKT VAL | PUR INT ACC INT |
|---|---|---|---|---|---|---|
| 1219 | 01/15/88 | TNOT | 10/15/86 | 7.500000 | 3,000,000.00 | |
|  | 01/15/88 |  | 10/15/88 | 101 13/32 | 3,042,187.50 | 1,849.32 |
| 1231 | 04/12/88 | TBON | 03/15/88 | 7.015625 | 2,000,000.00 | 11,148.12 |
|  | 04/13/88 |  | 03/15/98 | 100 01/32+ | 2,000,937.50 | 13,070.20 |
| 1234 | 04/15/88 | TBIL | 04/01/88 |  | 4,000,000.00 | |
|  | 04/15/88 |  | 10/01/88 | 99 24/32 | 3,891,208.80 | |
| 1236 | 04/17/88 | TNOT | 03/31/88 | 6.125000 | 1,000,000.00 | 3,020.55 |
|  | 04/18/88 |  | 03/31/90 | 99 24/32 | 997,500.00 | 3,020.55 |
|  |  |  |  |  | 10,000,000.00 | 14,168.67 |
|  |  |  |  |  | 9,931,833.80 | 17,940.07 |

FIGURE 3   PRIOR ART

BOND FILE
Lot # (key)
Security Type
Issue Date
Maturity Date
Interest Rate
Prior Payment Date
Next Payment Date
Int Calc Method
Par Amount
Book Value
Outstanding Purch Int TRANSACTION FILE
Transaction # (key)
Transaction Type
Trade Date
Settlement Date
Par Amount
Price
Interest Amount
Gain or Loss Amount
Dealer on Transaction PRICE FILE
Lot # (key)
Pricing Date
Market Price

FIGURE 4   PRIOR ART

BOND FILE
Issue # (key)
Security Type
Issue Date
Maturity Date
Interest Rate
Prior Payment Date
Next Payment Date
Int Calc Method TRANSACTION FILE
Transaction # (key)
Transaction Type
Trade Date
Settlement Date
Par Amount
Price
Interest Amount
Gain or Loss Amount
Dealer on Transaction PRICE FILE
Issue # (key)
Pricing Date
Market Price LOT FILE
Lot # (key)
Par Amount
Book Value
Outstdg Purch Int

FIGURE 5   PRIOR ART

ISSUE FILE
Issue ID (key)
Issue Date
Maturity Date
Security Type

TRANSACTION FILE
Transaction # (key)
Transaction Type
Trade Date
Settlement Date PURCHASED INT FILE
Lot # (key)
Transaction # (alt key)
Purchased Int Amount ACCRUAL FILE
Issue ID (key)
Interest Rate
Prior Payment Date
Next Payment Date LOT FILE
Lot # (key)
Transaction # (alt key)
Par Amount
Price
Dealer on Transaction INT RECEIPTS FILE
Lot # (key)
Transaction # (alt key)
Interest Receipt Amount PRICE HIST FILE
Issue ID (key)
Pricing Date
Market Price GAIN OR LOSS FILE
Lot # (key)
Transaction # (alt key)
Gain or Loss Amount TYPE FILE
Security Type (key)
Int Calculation Method

FIGURE 6

SECURITY INSTRUMENT DATA SYSTEM WITHOUT PROPERTY INAPPLICABLE NULLS

This invention relates to business systems and more particularly to a system and method for storage and retrieval of financial and investment data that makes more efficient use of computer processing facilities.

BACKGROUND OF THE INVENTION

The securities and investment industry is concerned with the management of money through the purchases and sales of assets which have one or more of the properties of security, earnings, or potential for gain in value. Assets include stocks, bonds, options, futures, currencies and the like. Effective management of information relating to these assets is a principal function of the financial industry. As the volume of data has increased, the industry has evolved from hand written records in ledgers to computer processing of the data.

The data may be characterized by three basic concepts, an issue, a lot, and a transaction. Examples of issues are X corporation common stock or 6 month US Treasury Bill issued Jan. 5, 1988. A lot (or position) is any currently held issue. Depending on accounting rules in force for a particular portfolio, there may be many lots (or purchases) of one single issue, or all purchases may be combined into one lot. Examples of lots are 10,000 shares of X corporation or $50,000 of 6 month US Treasury Bill of Jan. 5, 1988. A transaction is the purchase or sale of a lot or some other event which causes a change to a lot, e.g. a stock split or maturation of a bond.

The computer systems of the prior art use the conceptual entities of issues, lots, and transactions as the storage vehicles for security related computer systems. All of the attributes and properties of a particular issue, lot, or transaction are stored together in one place. This is exemplified by the file "TEMPO" in column 34 of U.S. Pat. No. 4,566,066 issued Jan. 21, 1986 to F. C. Thomas. This follows logically from the conventional records used before computers wherein all the information about a particular issue, lot, or transaction was recorded together in one place, for there would be no point in distributing the information to different pages of a ledger.

An example of the prior art use of computers to process the data is shown in FIGS. 1-5 for the sample case of a portfolio management system for a municipal government which is restricted by law to the purchase of government guaranteed bonds and which may not sell any lot at a loss.

SYSTEM REQUIREMENTS

FIGS. 1, 2, and 3 show the basic requirements for the system. FIG. 1 lists all of the information that will be entered into the system. This is the information which must be captured each time a security is purchased. FIG. 2 is the desired transaction report. It lists all of the activity which has taken place in the portfolio over a specified period of time. It is used to cross check that data entry was correct and to determine the total amount of interest which has been received in the period. FIG. 3 is an inventory report. It shows what is currently being held in the portfolio and what its value is.

PRIOR ART SYSTEMS DESIGN

The design of a standard system can be seen in FIG. 4. Notice that all of the data that relates to bonds is grouped together in one file or table. Notice also that all information about transactions is grouped together into one table. A variation on this theme is to separate out the information for an issue from the information for a lot as is shown in FIG. 5. Pricing can be done in a variety of ways. Two different methods are shown in FIGS. 4 and 5. There are a variety of others and the differences are not significant to the example.

The design of a standard system, then, is to handle purchases by accepting the data entered, separating out the issue, lot, and transaction information, adding a new issue (if it is not already present), adding a new lot (based on the accounting method in force), and adding a new transaction. Maturity transactions (data requirements not shown) cause the lot to be looked up, the par amount to be brought to zero, and a transaction to be added. Interest transactions (also not shown) cause the lot to be looked up, the outstanding purchased interest to be decremented to zero, and a transaction to be added.

The transaction report is generated by passing the transaction file or table and listing every transaction located. The inventory report is created by passing the lot file or table and listing everything with a non-zero par amount.

Discount bonds do not accrue interest. They pay more at maturity than was invested. This means that discount bonds do not have interest rates or any interest payment dates. With the standard designs in FIGS. 4 and 5, some value has to be stored for the coupon rate and the next and prior interest payment dates even when the bond being stored is a discount bond. This takes up space. It also requires the person using the computer to enter values that are irrelevant to the bond being purchased. If the user is to be prevented from having to make this effort, the computer program must be expanded to understand about discount bonds and put the dummy values in without asking the user. This commits a large amount of knowledge about the securities industry to code and makes the resulting system less flexible. Computer systems of the prior art have not solved this problem.

The same problem applies to the transaction file. With a bond purchase, there is no gain or loss involved. With a fixed transaction structure (the prior art method) either the user must enter a zero gain or loss or the computer program must contain logic that handles this difference between sales and purchases.

Another problem is that relational data base technology cannot be easily used to create the systems of the prior art, because records are different from one another. A relational system can only be used for storage and retrieval when all records are the same size. This requires the designer to combine different records together in one file and then add extra code to the system to distinguish between them.

Another problem with prior art systems is their lack of flexibility i.e. difficulty in adapting to change. In our previous example, consider the effect of adding a single new type of investment, GNMA bonds, which as government backed mortgages are legal for the municipal investment system. Assume the municipal government buys some. They are not easily added to the system. GNMA's don't have par amounts. That is their special feature. They have what is known as original face and a paydown factor. You must multiply the two to get par. With the standard method you have three choices at this point—add a new field to GNMA purchases called paydown factor and put original face in the par amount field (and add a dummy field to every new and existing record in the data base), throw out the original face and factor values after they have been entered and place the calculated amount in the par field (thereby losing data), or place the factor in another file, place the original face in the transaction's par field, and place the calculated par amount in the bond lot file (thereby creating a need for additional code to distinguish GNMA purchases and sales from purchases and sales of other types of bonds). Since the latter method saves all the data without adding disk storage overhead to the system, it will probably be the one taken. In addition, logic will have to be added to the transaction report to calculate par for GNMA's since the par field can no longer be placed directly onto the report (since original face has been stored there). This one new type of asset, because of its different attributes, has required every single record to be changed and extra code to burden the entire system.

General investment systems must be able to handle a great many more different types of investments including stocks, puts, calls, etc. and within each type of investment there are a multitude of different subtypes with unique attributes.

Many of the new data base management systems require that each file record be of the same length. Since some issues have different attributes than others, a space must be provided in every record for every possible attribute and a null, zero, or blank entered when that attribute doesn't pertain to that particular record. The overhead to mark fields as empty and the space occupied by nulls may be greater than that due to real data. Also, many third generation languages do not handle nulls so the systems lose the advantage of the new languages. When all related transactions with all possible variants are combined within one structure, the structure is so large that the real data in any given transaction occupies only a small percentage of the total space set aside in the structure.

This leads to a data field definition problem. It becomes difficult for programmers to determine the exact definition of any given field since they are so infrequently used. The more often the field is empty, the more difficult it is to pin down the exact definition for the field. The temptation is great to convert a null field of the proper type and size to a slightly or vastly different use. This is also easily done by accident, especially when large numbers of fields are empty, as is normal case.

Once one or more fields gain more than one definition, the complexity of the system begins to mushroom. Logic needs to be added to distinguish between valid and invalid data in a field and the flexibility of the system is diminished. Eventually circumstances will change and the previously inapplicable field will suddenly become applicable. Unfortunately, the field is now in use for other purposes and a second field will have to be added. More logic is needed to determine in which field data is to be stored and from which field it is to be retrieved. As the complexity grows, so does the cost to maintain the system as well as the cost to add enhancements. The number of hidden bugs increases and the speed and efficiency of the system drops. All of these problems can be eliminated by eliminating the need for property inapplicable nulls.

SUMMARY OF THE INVENTION

It is accordingly an object of the invention to establish a system and method by which securities data (which represents a system with a large amount of variation) can be stored without resorting to the use of property inapplicable nulls. It is yet another object of the invention to provide a system and method for computer processing of asset data with enhanced flexibility for addition of new assets with different properties that reduces the burden on the processing task by separating the data for storage and retrieval into individual attribute groups which are then stored in separate files.

The system and method of the invention breaks apart each of the assets or high level objects (money market instruments, government/agency issues, stock etc.) and reassembles them into functional groups. Each asset has an identifying key that is carried by each attribute group. Each attribute group is stored separately and is retrieved by the key. Many different assets may share a common attribute group having a common function applicable to it, such as a means for calculation of interest, etc. A functional hierarchy containing that attribute group is then shared by all assets having that property in common. The highest level entry in that hierarchy carries the identifying key along with a definition of the associated attribute groups. This allows only the necessary files to be searched. Furthermore, only the attributes necessary for a particular process (e.g. a sale) will be retrieved according to the information found in the highest level entry of the hierarchy. Many of the operations and calculations that will not change can be performed at first entry and will not require recalculation.

To summarize the invention in symbolic terms: We have various security instrument types A, B . . . J. Each instrument has certain attributes a, b . . . q that are used in preparing screens, documents, reports, etc. These attributes are organized into functionally related groups I, II . . . X which are themselves organized into a branching hierarchy. The attributes associated with each functional group are determined and this information is stored in memory (e.g. group II requires a, d, e, and f; III requires b, c, and h; and so on). A separate table is established for each related group of attributes and the associated attribute values are stored there.

Whenever a new type of security instrument (e.g. K) is to be added to the system, the necessary functional groups are determined, (i.e. if only II and III apply, then only values for attributes a, b, c, d, e, f, and h are stored for K entries). The new type of instrument (K) is given an identifying access code or key (KK) by which its data can be retrieved from any table. An entry is created in the highest level table of the hierarchy that can be accessed by various instrument descriptors such as instrument name. This entry contains the key value (KK) and the identity of the tables containing the values for the attributes which describe the instrument (e.g. instrument K references groups II and III). In each of the group tables (i.e. II and III), but not in any other tables, values for attributes which describe instruments if the new type (K) will be stored and retrieved (referenced by the key KK). In practice, a program will simply ask the operator to enter particular data and it will be stored automatically in the appropriate tables once they have been established.

The group tables themselves can also contain references to other tables containing additional attributes. This will direct the search to those tables as well.

To prepare a document, the attributes necessary for its preparation are determined and this information is stored (e.g. document 1 requires group II attributes a, d, e, and f; document 2 requires both group II and III attributes a, b, c, d, e, f, and h). To prepare a particular document (e.g. document 1) the index is accessed by an instrument identifier (e.g. instrument name) to retrieve the reference code (e.g. KK) and the identity of the tables containing the attributes for that instrument. The required tables are accessed by the key and the data retrieved therefrom. The retrieved data are then used to prepare the document.

When a new type of instrument (e.g. L) is encountered with a new functional group (e.g. XI), the attributes necessary for its description are defined (e.g. r, s, and t) and a new table is established for the new group (i.e. XI). The key of the instrument (e.g. LL) and the identity of the tables containing the attributes (e.g. II and XI) are stored in the highest level table of the hierarchy. In this way there is no need to establish a set of values (such as nulls) for group III attributes for instruments of type L.

FIG. 11 is a diagrammatic illustration of the overall system. These and other features, advantages and objects of the present invention, will become more apparent upon study of the detailed description and drawings appended herewith.

BRIEF DESCRIPTION OF THE DRAWINGS

FIG. 1 shows a purchase data entry form.
FIG. 2 shows a transaction report.
FIG. 3 shows an inventory report
FIG. 4 shows a file layout of the prior art.
FIG. 5 shows an alternative file layout of the prior art.
FIG. 6 shows various files used in the invention.

DETAILED DESCRIPTION OF PREFERRED EMBODIMENT

A preliminary step in the process of preparation of the system for operation is the determination of what data is expected to be stored, retrieved, and processed by the system for each and every type of investment vehicle to be handled. This may be determined by interviewing prospective users. It may also be determined by an inspection of the data being used by existing, conventional systems. FIG. 1 is an example of a data entry sheet that is in use for conventional systems. On it are indicated a number of different data fields (also known as data attributes) whose values would be used in the operation of any system.

Figure 9:
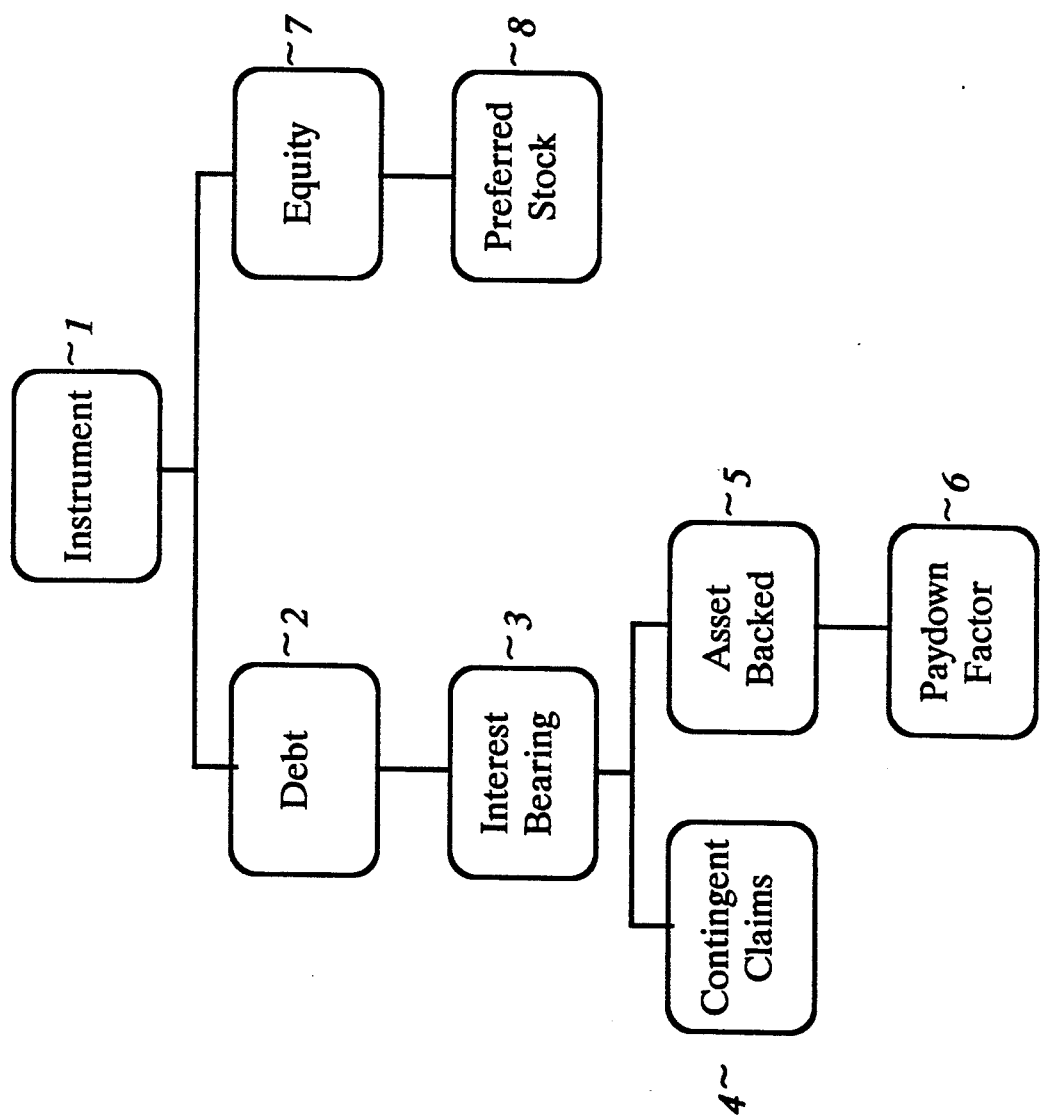
FIG. 9 illustrates the storage organization of commonly required data on investment instruments.
Figure 10:
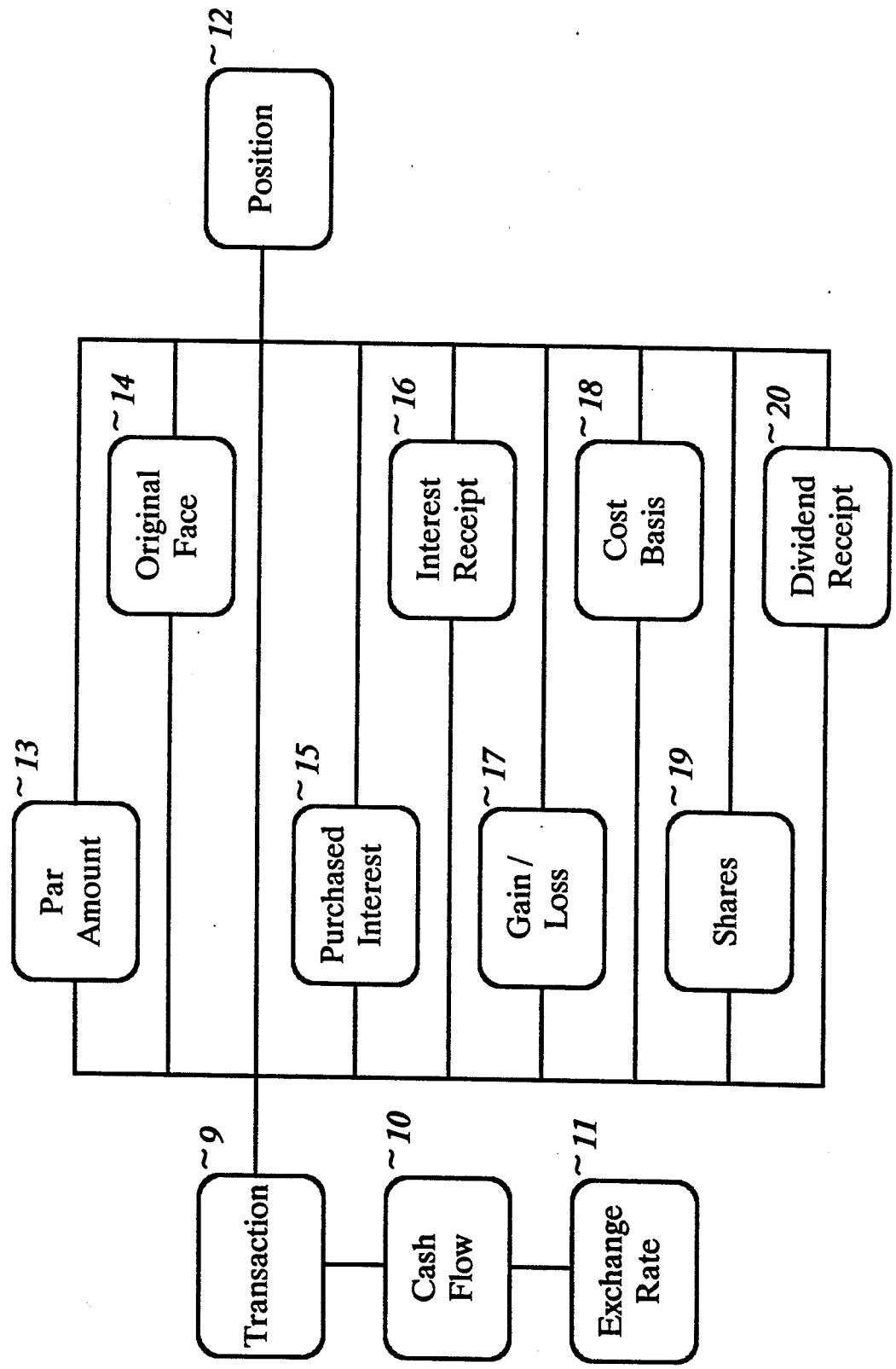
FIG. 10 shows the transaction/position data base.

Once a complete set of data attributes has been collected, the following method is then used to organize this data for storage and retrieval operations:

a) Classify each data attribute by identifying first the broad category of investment data it describes (e.g. instrument, transaction, position, and so on), and then the smallest feature of that category that it always is relevant to. For example, interest rate is a characteristic of some, but not all, debt instruments; however, it is always relevant to the interest bearing feature of debt. Therefore, interest rate would be classified as an attribute of the interest bearing feature of debt instruments. Dividends are a feature of common stocks.

b) Group all attributes that are relevant to the same feature together and treat them as a single functional group (for example, interest rate, interest payment frequency, first interest date, and last interest date would be classified as attributes of the interest bearing feature of debt) then compile a list of these groups.

c) Organize the functional groups themselves into branching hierarchies by insuring that each feature is located on a hierarchy beneath every other feature that always will be present whenever the feature being classified is present. For example, FIG. 9 shows a branching hierarchy for securities. Since interest bearing is a feature of debt instruments, it cannot be present unless debt instruments are present. Therefore, it is beneath debt on the hierarchy and debt is beneath instruments on the hierarchy. Debt instruments, on the other hand, can be interest bearing or noninterest bearing; however, they are always security instruments. Therefore, debt must be located on the hierarchy above interest bearing but below instruments. FIG. 10 is an example of two hierarchies that overlap (par amount is always related to both transactions and positions but cash flow is always related only to transactions).

d) Add the attribute or attributes that uniquely identify the feature at the top of each hierarchy to every other feature group in the hierarchy. This allows all of the data in the hierarchy to be referenced by a common key. For example, in the hierarchy shown in FIG. 9, instruments are uniquely identified by CUSIP numbers. Therefore, a CUSIP number attribute must be an attribute of every feature group shown (including the interest bearing feature described above). A place is provided for introducing a value for this attribute (e.g. CUSIP number) in every group in the hierarchy.

e) For each feature that is not at the top of a hierarchy, add to the feature immediately above it in the hierarchy one or more navigational attributes that define whether or not the subordinate feature contains additional data of interest and define each of the values that this attribute is allowed to have. For example, the debt feature group will contain an Interest Bearing? yes or no attribute. If the value is yes (for interest bearing debt instruments), additional data will be found in the interest bearing group. If the value is no (for non-interest bearing debt instruments), no additional data will be found beneath debt in the hierarchy.

f) Create a list of every navigational attribute added to any functional group in the hierarchy. The feature group at the top of the hierarchy represents the broad category of investment information being stored in the hierarchy (e.g. securities instruments, transactions, or positions). For every different type of that category (e.g. types of securities instruments may include common stock, discount bonds, etc.; types of securities transactions may include purchases, sales, dividend receipts, etc.) define the constant value to use for each navigational attribute when processing that type. For example, FIG. 9 shows the security instrument branching hierarchy. This hierarchy is used for the storage of data about security instruments. The following table shows the constant value (either yes or no) used for the Interest Bearing navigational attribute for a number of different types of securities instruments:

| Treasury Bill | Interest Bearing = "NO" |
| Treasury Note | Interest Bearing = "YES" |
| Treasury Bond | Interest Bearing = "YES" |
| GNMA Mortgage | Interest Bearing = "YES" |
| Common Stock | Interest Bearing = "NO" |

Figure 12:
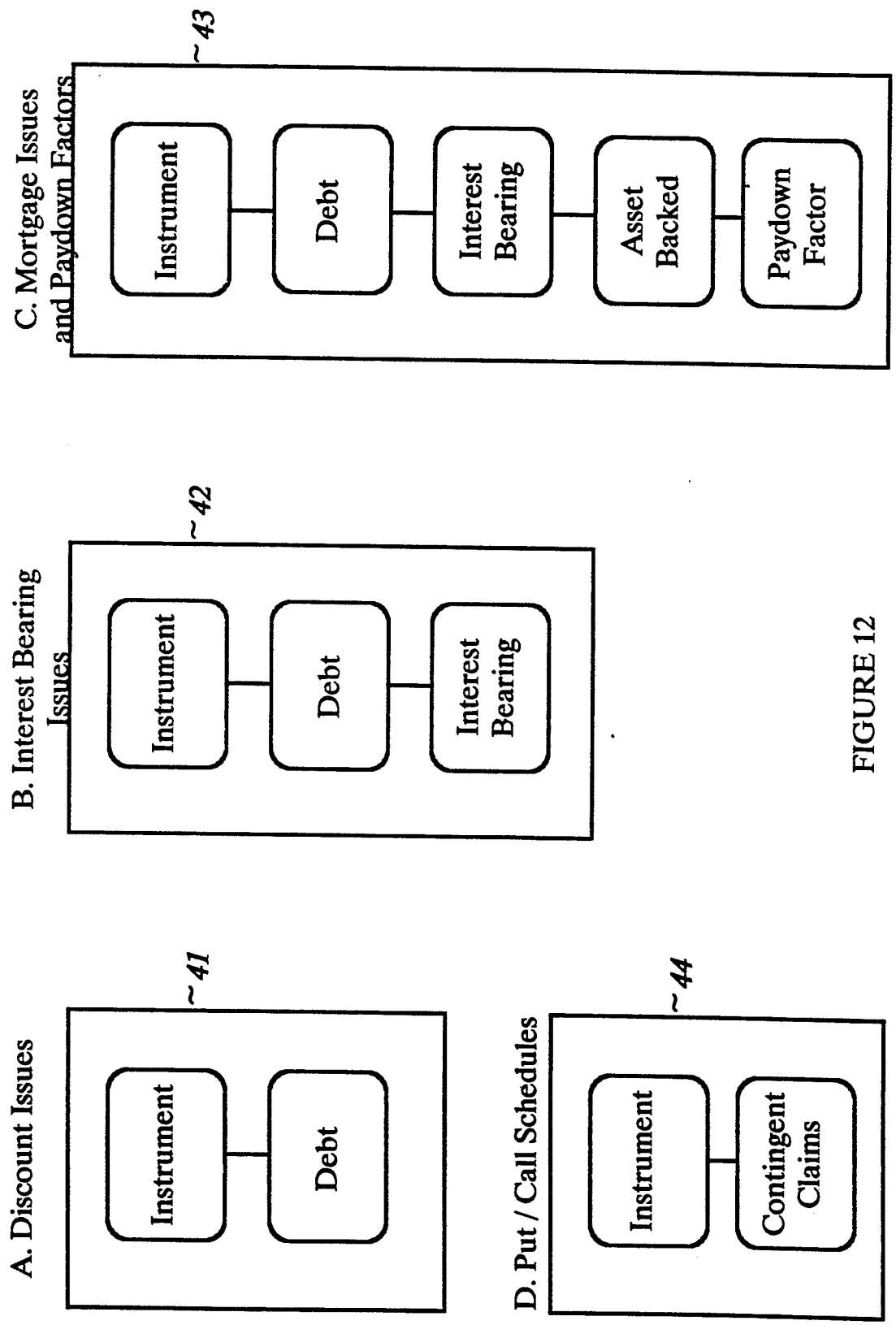
FIG. 12 shows the higher organization of an instrument data base.

A list of this type must be defined for all navigational attributes for all instrument types.

g) Starting at the top of the hierarchy, combine groups from multiple consecutive levels (based on the values for each of the navigational attributes defined above) to create logical units that can be manipulated by application programs. For example, FIG. 12 shows how three different types of securities would be manipulated by application programs. Every security type will use a unique combination of groups. FIG. 12-D shows that intervening levels can be left out whenever the intervening functional groups (although appropriate) are not needed by the application program.

Securities data are variable and diverse. For example, very few attributes are appropriate to all types of instruments. Prior art systems handled this diversity by filling inappropriate attributes with predefined null values requiring both additional disk space to hold the null values and additional time to store and retrieve those null values. The result of the above partitioning process of the invention is a data structure that can handle diversity without the use of null values. Since this data structure does not require the use of null values, there is no wasted disk space and no wasted time storing or retrieving values that are not appropriate. Systems developed with this method have the following novel operational characteristics after they have been configured:

1) The type of instrument or transaction is first identified by the operator of the system and entered into the system in response to interrogation by the system (e.g. is the new instrument to be entered a common stock?, a discount bond?, and so on).

2) Each of the functional groups to be manipulated by the system will be identified by the system by selection of the groups of attributes characteristic of that type of instrument.

3) If data entry is being done, the system will request the entry of only relevant data (i.e. those from the selected groups) and will store only relevant data. If data display is being done, the system will retrieve only relevant data and will display to the user only relevant data.

Characteristic #3 above provides the main benefits of this novel approach. By storing and retrieving only relevant data, system performance, disk space requirements, and system flexibility are all improved.

The above method is appropriate for handling most forms of diversity in securities data (different types of instruments, different types of transactions, different types of positions, and the like).

As shown in FIG. 6, the data related to a single asset (high level object) is now dispersed in a number of individual files for storage and retrieval.

One of the attributes of bonds is that it accrues interest. FIG. 6 shows that information relating to the interest accrual attribute is separated out from other information about the issue. Interest rate, prior payment date, and next payment date are all required for the calculation of interest amount and are all stored together, separate from everything else. This is a significant improvement over prior art systems.

Discount bonds do not accrue interest. They pay more at maturity than was invested. This means that discount bonds do not have interest rates or any interest payment dates. With the prior art systems as shown in FIGS. 4 and 5, some value has to be stored for coupon rate and next and prior date even when the bond being stored is a discount bond. This takes up space. It also requires the person using the computer to enter values that are irrelevant to the bond being purchased. If the user is to be prevented from having to make this effort, the computer program of the prior art must be expanded to understand about discount bonds and put the dummy values in without asking the user. This commits a large amount of knowledge about the securities industry to code and makes the resulting system less flexible. The major benefit of the improved data storage method of the invention is that it eliminates this problem by eliminating the need to store dummy values.

It simply creates two types of transactions, an interest bearing bond purchase and a discount bond purchase. The difference is that the table with accrual information is not accessed when a discount bond purchase is entered so that null values need not be stored. Whenever a table is accessed, it handles every field in the table. This makes the logic easier to build and the computer program smaller and more flexible. It needs one routine for each table to be updated plus some control logic to determine which tables to update.

The same advantage applies to the transaction file. With a bond purchase, there is no gain or loss involved. With a fixed transaction structure (the prior art method) either the user must enter a zero gain or loss or the computer program must contain logic that handles the difference between sales and purchases. With the system of the invention, gains and losses are placed into a different file or table. This appears to be far more complex than the much smaller number of files shown in FIGS. 4 and 5 for the prior art, which may explain why it has never been used before. However, whenever a new asset or new transaction is added to the portfolio, it will be found that most or all of the attributes will be found among existing files so that the burden of adding complex new issue types is greatly reduced over that for prior art systems. Furthermore, the data processing cost of preparing reports such as FIGS. 2 and 3 is greatly reduced over the prior art because the initial contact with the high level object is then directed through the keys only to those files necessary for the preparation of the report.

The difference between a purchase and a sale is that a purchase doesn't update the gain or loss table and a sale does. Again, all that is necessary is to have some computer program logic for each file and some additional logic to say which tables are updated with each type of transaction.

To create the transaction report, one looks through the transaction file and picks up the additional information required for the report from the files updated when the transaction was entered. To create the inventory report, one looks through the lot file for lots with non-zero par amounts and picks up the additional information from the associated lot files. The files to be used are determined by the report. For example, since no gain or loss appears on the inventory report, one need not look up anything in that file when creating the report.

The method of the invention has another significant advantage over the standard method. One can use relational data base technology to create the system. It cannot be used easily with the standard design. In the prior art, records stored within one file are different from one another and so the relational system can only be used for storage and retrieval when the designer has forced all records to be the same size and placed data with similar formats at the same locations. This requires the designer to add extra code to the system to distinguish between them. With the system of the invention, all of the facilities of the relational data base can be used without a requirement for added code.

Another advantage of the method is flexibility. Let's add an enhancement to the system. Since GNMA's (which are government backed mortgages) are legal for the system, let's say the municipal government buys some. As was mentioned earlier, they are not easily added to the system. GNMA's don't have par amounts. That is their special feature. They have an original face and a paydown factor. You must multiply the two to get par. With the standard method, you have three choices at this point—add a new field to GNMA purchases called paydown factor and put original face in the par amount field (and add a dummy field to every new and existing record in the data base), throw out the original face and factor values after they have been entered and place the calculated amount in the par field (thereby losing data), or place the factor in another file, place the original face in the transaction's par field, and place the calculated par amount in the bond lot file (thereby creating a need for additional code to distinguish GNMA purchases and sales from purchases and sales of other types of bonds). Since the latter method saves all the data without adding disk storage overhead to the system, it will probably be the one taken. In addition, logic will have to be added to the transaction report to calculate par for GNMA's since the par field can no longer be placed directly onto the report (since original face has been stored there).

With the system of the invention, the enhancement is trivial. A new file or table called the original face file (keyed on lot number) is added. In it, the original face and paydown factor are stored. The lot file still contains the calculated amount of par and the transaction report doesn't change. The logic that indicates which tables to update with which transactions is amended to show that a GNMA purchase updates the original face table in addition to the table normally adjusted for bonds. That's it. A new feature does not cause a problem because features are stored separately.

This same method can be used with a large amount of variations. It depends on the application to be automated. For example, with the GNMA example just shown, a new table could have been created keyed by issue ID to store just the paydown factor while the table keyed by lot number would still be used to store the original face. This has some advantages with respect to mortgage backed securities which are beyond the scope of this discussion. Another trivial change is to remove the issue and maturity dates from the file with security types and place them in a separate table if other types of securities (such as common stock) are to be allowed in the system since these items are not relevant to anything but bonds (with the standard system, bonds, are usually stored as shown and stocks are stored in a separate file).

Figure 7:
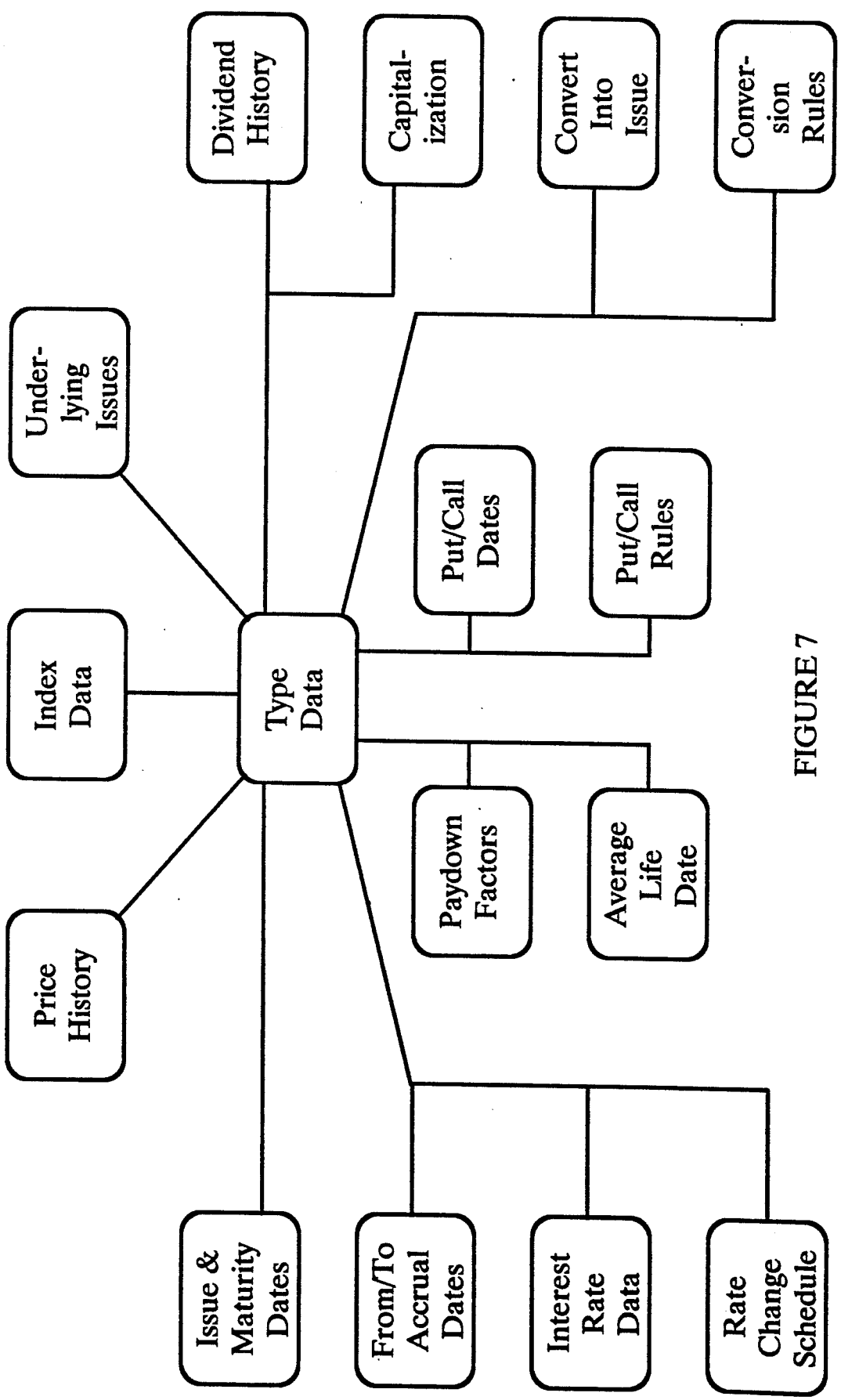
FIG. 7 shows basic files required to define a complex issue.

As the complexity of the system is increased (and this example is an extreme simplification over those used in real life), more features of securities come into play. Histories are required, there are features known as puts and calls which must be stored, there are conversions which must be handled, etc. But the mechanism is the same. Each feature is assigned to a separate file along with related information. FIG. 7 shows the basic types of files which would be used to replace the standard stock and bond files in a complex application.

Figure 8:
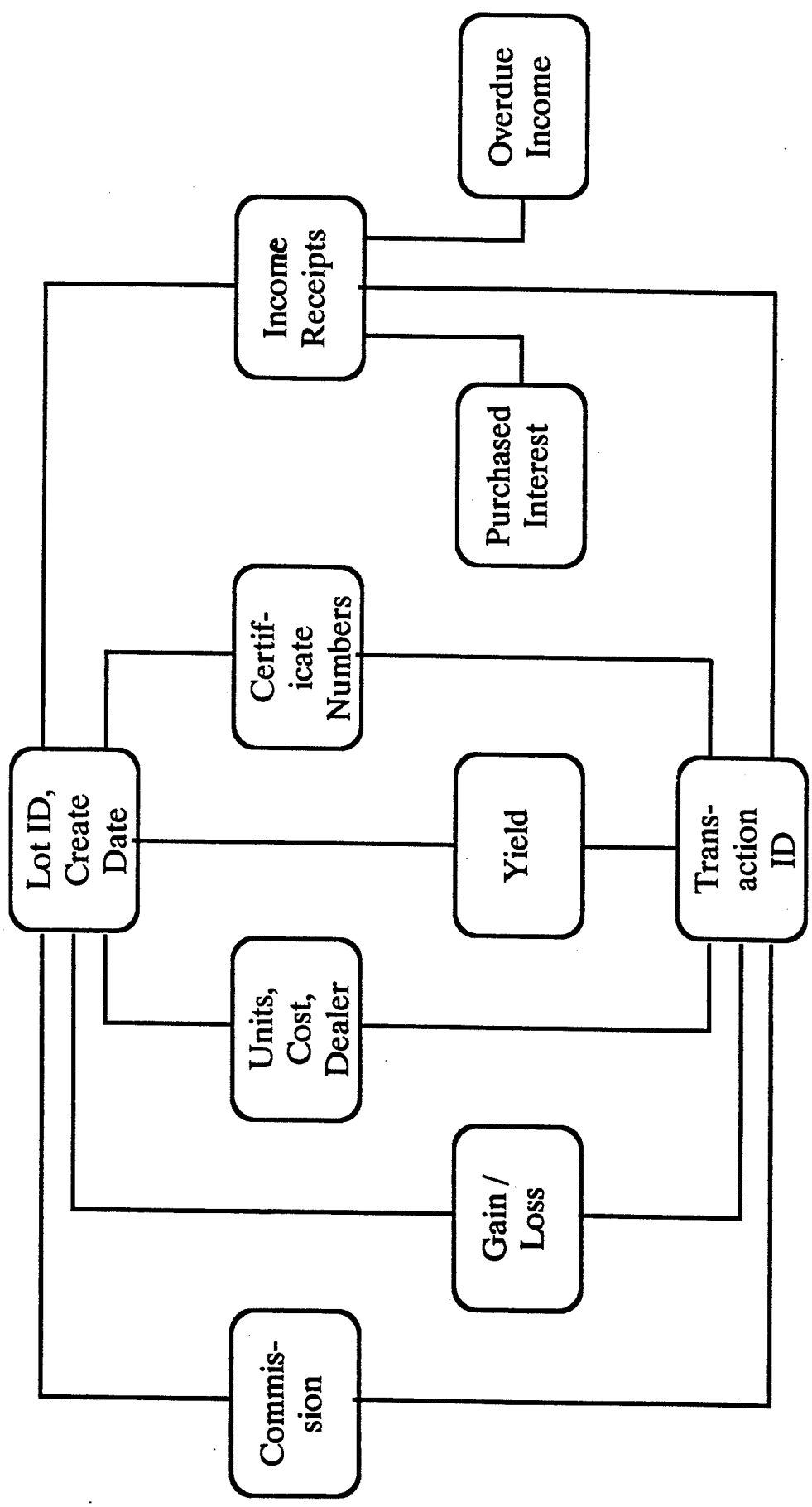
FIG. 8 shows additional files required with transactions and lots for the issues of FIG. 7.

Likewise there are a significant number of additional files or tables required with transactions and lots in a complex system. FIG. 8 shows some of these. A stock system must handle commissions, yields must be calculated and stored, certificate numbers for lots must be stored, defaults on interest must be handled, and many more. Yet, again, the principal is the same. Each new attribute of a transaction is stored in a separate file or table and a new transaction is created to handle it. Each table has its own code and the logic for determining which table to process is kept in a separate location and updated whenever a new transaction type is added. Whereas, with the prior art design, transactions are added as described with the original face example—by storing data with similar formats in the same location of different records (e.g. a field will carry par amounts in one record and original face amounts in another; another field will carry interest amounts in one record and commissions in another; interest payment dates will overlap with put and call dates; and so on). The code for data entry and the code for reporting must be updated every time a new variation is added. The system becomes bigger and bigger and less and less flexible with each enhancement.

There are two key aspects to this novel method. First, instrument data is stored (and retrieved) by instrument feature rather than by instrument type. FIG. 9 is a data structure diagram which illustrates the storage organization of the most commonly required data on investment instruments. Each rounded box represents a data base table (or data file depending on the method of implementation). Each line connects two files or tables which have the same key. Notice that all tables are connected and, therefore, all tables share a common key. This is to be expected based on the normalizing process used (see step d).

Block 1 on FIG. 9 represents the base instrument table. It contains all of the data which is common to all instruments (like stocks, bonds, options, and so on). Typically included for storage in this table would be the search key for the instrument, a textual description of the instrument, and one or more fields which define the instrument. An illustrative table definition in the fourth generation language SQL is shown at Label 21 in Table I of the appendix.

Figure 11:
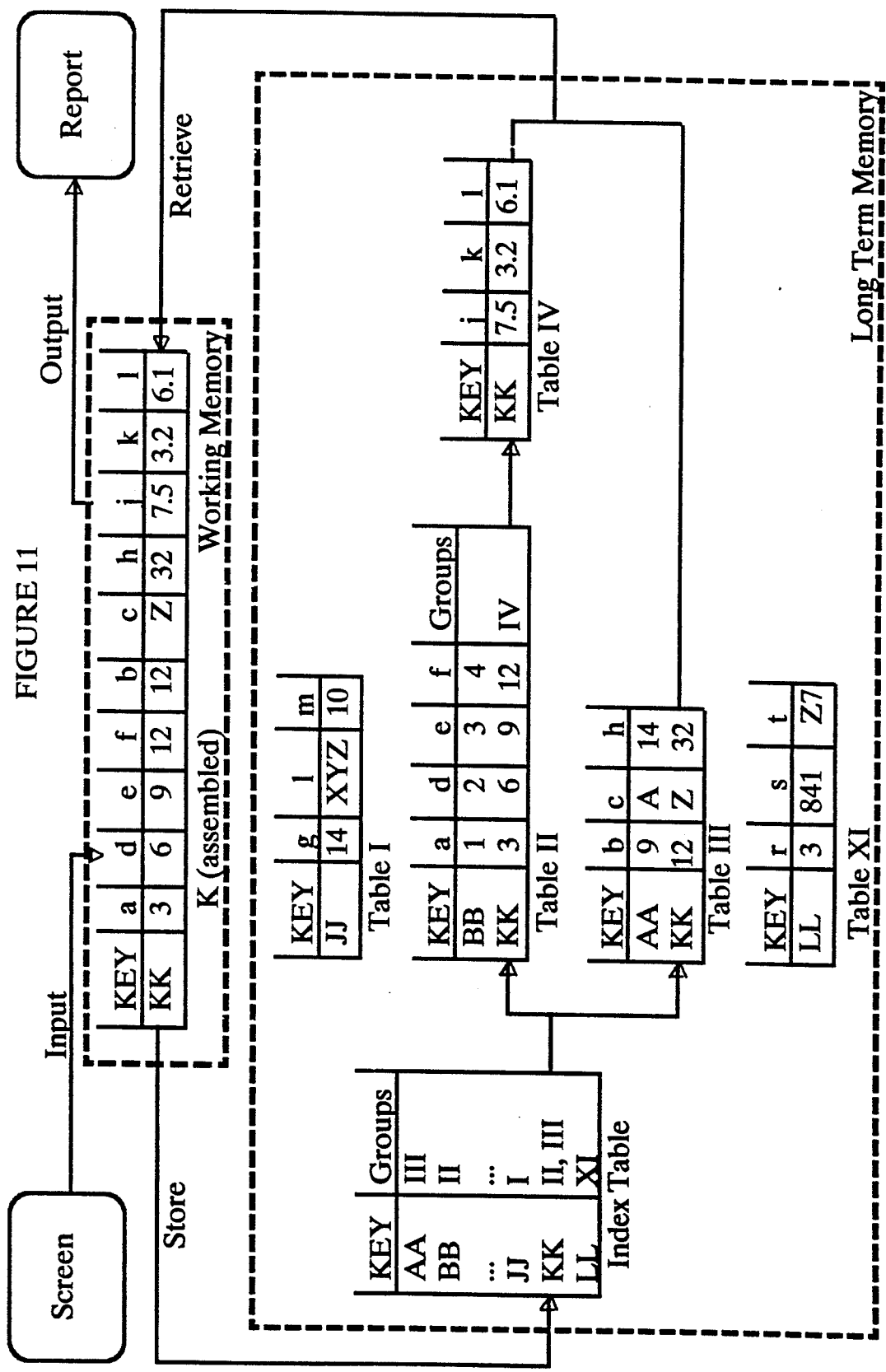
FIG. 11 shows the overall system of the invention in diagrammatic form.

Block 2 on FIG. 9 represents the debt instrument table. It contains all of the data which is common to all debt instruments (like discount notes, treasury bonds, mortgage pools, and so on). Typically included for storage in this table would be the search key for the instrument (so that all data relevant to a single issue could be recombined as needed), the issue date of the instrument, the maturity date of the instrument, and one or more fields which define the debt instrument. An illustrative table definition is shown at Label 22 in FIG. 11.

Block 3 on FIG. 9 represents the interest bearing debt instrument table. It contains all of the data which is common to all interest bearing debt instruments (like treasury notes, interest bearing certificates of deposit, and so on). Typically included for storage in this table would be the search key for the instrument, the previous interest payment date, the next interest payment date, the interest rate of the instrument, the method by which the instrument calculates interest, and one or more fields which define the interest bearing feature of the instrument. An illustrative table definition is shown at Label 23 in Table I of the appendix.

Block 4 on FIG. 9 contains data on the contingent claims options of interest bearing debt instruments. It contains all of the data which is common to all debt instruments which have contingent claims provisions (like puts, calls, sinking funds, and so on). Typically included for storage in this table would be the search key for the instrument, the type of contingent claim option, the date at which the option can be executed, the last date for notification of intent to execute the option, and the redemption price. An illustrative table definition is shown at Label 24 in Table I of the appendix.

Blocks 5 and 6 on FIG. 9 represent the asset backed debt instrument tables. They contain all of the data which is common to all asset backed instruments (like Ginnie Maes, Freddie Macs, CARs, and so on). Two tables are used because asset backed instruments have some description data which rarely ever changes (see Table 5) and some data which changes frequently (see Table 6). Typically included for storage in the descriptive data table (Table 5) would be the search key for the instrument, the pool number, and the average lift date. Typically included for storage in frequently changing data table (Table 6) would be the search key for the instrument, paydown factors, and associated effective dates. Illustrative table definitions are shown at Labels 25 and 26 in Table I of the appendix.

Block 7 on FIG. 9 represents the equity instrument table. It contains all of the data which is common to all equity instruments (like common stocks, preferred stocks, and so on). Typically included for storage in this table would be the search key for the instrument (so that all data relevant to a single stock could be recombined as needed), the ticker symbol, the class code, the exchange on which it is traded, the SIC code, the number of outstanding shares, and one or more fields which define equity instruments. An illustrative table definition is shown at Label 26 in Table I of the appendix.

Block 8 on FIG. 9 represents the preferred stock instrument table. It contains all of the data which is common to all preferred stock instruments. Typically included for storage in this table would be the search key for the instrument, the dividend rate, and the effective date of the dividend rate. An illustrative table definition is shown at Label 27 in Table I of the appendix.

Another novel aspect of this system is shown in FIG. 10. As in FIG. 9, each rounded box represents a data base table (or data file depending on the method of implementation) and each line connects two files or tables which have the same key. However, notice that all of the tables in the center of the FIG. (Labels 13, 14, 15, 16, 17, 18, 19, and 20) are connected to two different tables (Labels 9 and 12 which are also connected directly to one another). As discussed above, application of the normalization process resulted in transactions and positions being stored in a common structure. If one wishes to look at the position data, one merely looks at the transaction data from a different perspective. Using a common data structure eliminates the need to keep transactions and positions in synch with each other. In addition, as with FIG. 9, transactions (and positions) are stored in functional groups rather than by transaction type or type of issue.

Block 9 of FIG. 10 represents the base transaction table. It contains all of the data which is common to all transactions (like purchases, sales, stock splits, and so on). Typically included for storage in this table would be the search key for the transaction, the search key for the lot affected by the transaction (where the instrument involved in the transaction would be defined), the type of transaction, and the date that the transaction was entered into. An illustrative table definition in the fourth generation language SQL is shown at Label 29 in Table II of the appendix.

Block 10 of FIG. 10 contains any cash flow data associated with a transaction. It contains all of the data that is common to transactions which involve some type of cash flow (like purchases, sales, dividend payments, and so on). Typically included for storage in this table would be the search key for the transaction, the settlement date of the transaction, the date the cash was expected to change hands, the price at which the transaction occurred, and the total amount of cash involved. An illustrative table definition is shown at Label 30 in Table II of the appendix. Notice that the search key for the lot affected by this transaction is not included in this table since this information has no effect on position data (this data does not overlap with any position data).

Block 11 on FIG. 10 contains any exchange rate data associated with a transaction. It contains all of the data that is common to transactions which involve some type of cash flow in a foreign currency (like stock purchases on foreign exchanges, interest payments from foreign bonds, and so on). Typically included for storage in this table would be the search key for the transaction and the exchange rate on the transaction. This information is stored with the transaction rather than in a separate exchange rate table because, with any given transaction, the exchange rate may have been negotiated separately or it may simply differ from the daily closing rate in the spot market. An illustrative table definition is shown at Label 31 in Table II of the appendix. As with Block 10, the search key for the lot affected by this transaction is not included in this table (for the same reason).

Block 12 on FIG. 10 represents the base position table. It contains all of the data which is common to all investment positions (in stocks, bonds, futures, and so on). Typically included for storage in this table would be the search key for the position (also known as the lot), the search key for the transaction which created the lot, the search key for the instrument in which the position has been taken, and the account or portfolio number which the lot has been assigned (or from which the money to purchase the instrument was taken). An illustrative table definition is shown at Label 32 in Table II of the appendix.

Block 13 on FIG. 10 contains all of the data common to all investment transactions and positions which involve par amounts (like bond purchases, bond sales, bond positions, and so on). Typically included for storage in this table would be the search key for the lot, the search key for the transaction which altered the par amount, the amount of change in par, and the new current total amount of par in the lot. An illustrative table definition is shown at Label 33 in Table II of the appendix.

Block 14 on FIG. 10 contains all of the data common to all investment transactions and positions which involve original face amounts (like mortgage pool purchases, mortgage pool sales, mortgage pool positions, and so on). Typically included for storage in this table would be the search key for the lot, the search key for the transaction which required an original face amount, the original face amount, and the paydown factor at the time of the transaction. An illustrative table definition is shown at Label 34 in Table II of the appendix.

Block 15 on FIG. 10 contains all of the data common to all investment transactions and positions which involve (directly or indirectly) purchased interest amounts (like bond purchases, interest payment receipts, bond positions, and so on). Typically included for storage in this table would be the search key for the lot, the search key for the transaction which affected the purchased interest total, the amount of the change in purchased interest, and the new current total amount of outstanding purchased interest in the lot. An illustrative table definition is shown at Label 35 in Table II of the appendix.

Block 16 on FIG. 10 contains all of the data common to all investment transactions and positions which involve interest receipts (like coupon payments, maturities, bond positions, and so on). Typically included for storage in this table would be the search key for the lot, the search key for the transaction which received the interest, the amount of interest received, the amount of the receipt which was earned, and the new current total amount of earned interest for the lot. An illustrative table definition is shown at Label 36 in Table II of the appendix.

Block 17 on FIG. 10 contains all of the data common to all investment transactions and positions which involve gains and losses (like bond sales, stock sales, bond and stock positions, and so on). Typically included for storage in this table would be the search key for the lot, the search key for the transaction which realized the gain or loss, the amount of the gain or loss, and the new current total amount of gain or loss for the lot. An illustrative table definition is shown at Label 17 in Table II of the appendix.

Block 18 on FIG. 10 contains all of the data common to all investment transactions and positions which involve a cost basis (like bond purchases and sales, amortizations, and so on). Typically included for storage in this table would be the search key for the lot, the search key for the transaction which altered the cost basis, the amount of the change in the cost basis, and the new current cost basis for the lot. An illustrative table definition is shown at Label 38 in Table II of the appendix.

Block 19 on FIG. 10 contains all of the data common to all investment transactions and positions which involve share amounts (like stock purchases and sales, stock splits, stock positions, and so on). Typically included for storage in this table would be the search key for the lot, the search key for the transaction which altered the number of shares, the amount of the change in the number of shares, and the new current total number of shares in the lot. An illustrative table definition is shown at Label 39 in Table II of the appendix.

Block 20 on FIG. 10 contains all of the data common to all investment transactions and positions which involve dividend amounts (like dividend receipts, stock splits, and so on). Typically included for storage in this table would be the search key for the lot, the search key for the transaction which received the dividend, the dividend amount and the new current total amount of dividends received by the lot. An illustrative table definition is shown at Label 40 in Table II of the appendix.

Figure 13:
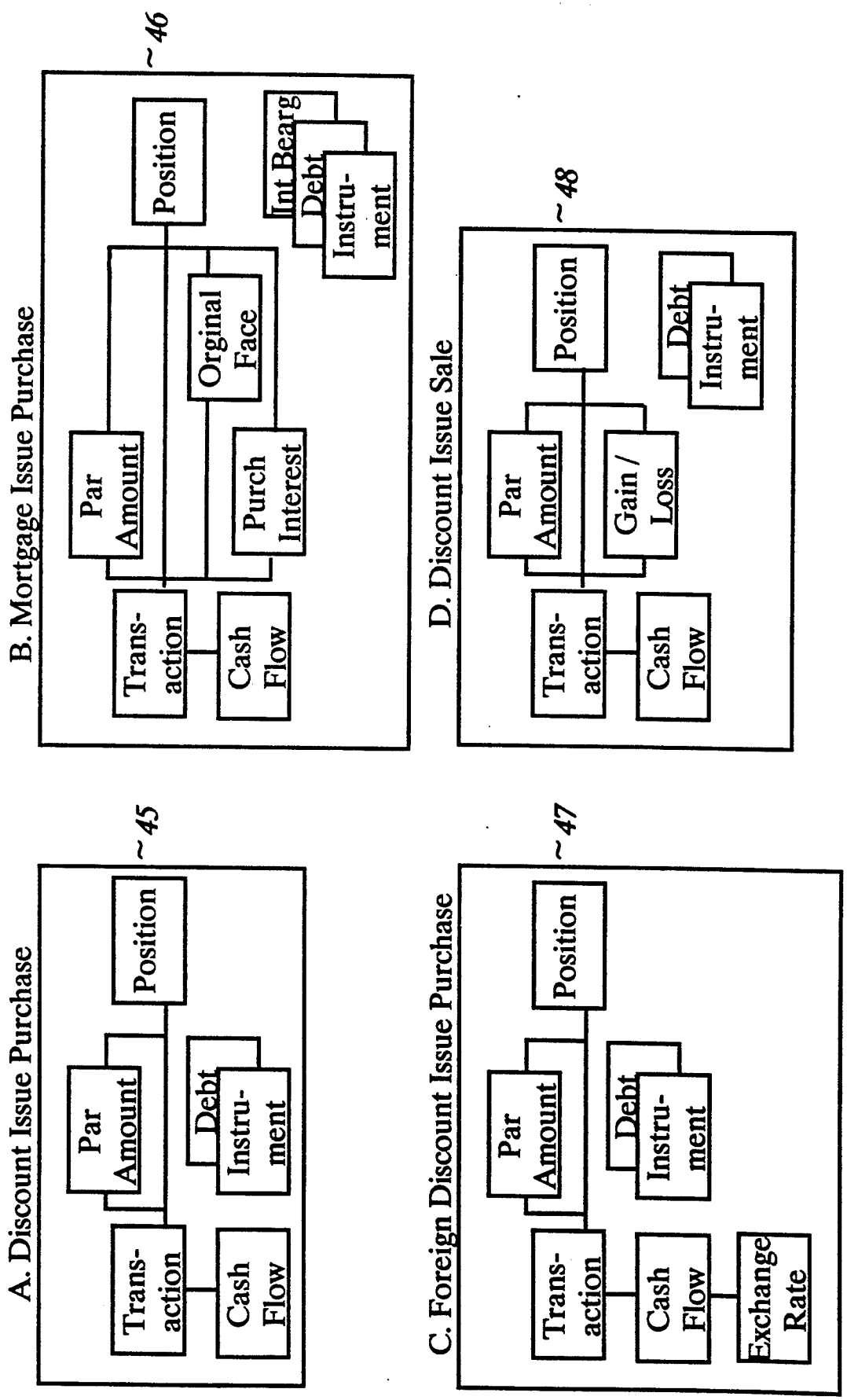
FIG. 13 shows the higher organization of a transaction/position data base.

The final novel aspect of this method is shown in FIGS. 13 and 14. As in FIGS. 9 and 10, each rounded box represents a data base table (or data file depending on the method of implementation) and each line connects two files or tables which have the same key. However, unlike FIGS. 9 and 10, each group of rounded boxes are surrounded by another box. This outer box indicates that the data content of each of the files or tables enclosed by it should be combined and that the combination creates a higher level structure which has value as a unit. The combination is known in data base parlance as a view (since it is an alternate view on how the data should be organized). It should be noted that these views, which can be logically created in a wide number of variations using the improved storage method, correspond with the physical storage methods common to prior art systems.

Block 41 on FIG. 13 indicates the higher level data grouping which represents the entirety of the data required to define discount issues (like treasury bills, discount certificates of deposit, and so on). Notice that discount issues are the simplest form of debt instrument. This view can be used as a unit for the purposes of data entry and data retrieval. The keys to the view are a combination of the keys to all of the included tables. An illustrative view definition in the fourth generation language SQL is shown at Label 49 in Table III of the appendix.

Block 42 on FIG. 13 indicates the higher level data grouping which represents the entirety of the data required to define interest bearing bond issues (like treasury notes and bonds, interest bearing certificates of deposit, and so on). Note that interest bearing bonds are a specialized type of debt issue. This view can be used as a unit for the purposes of data entry and data retrieval. The keys to the view are a combination of the keys to all of the included tables. An illustrative view definition is shown at Label 50 in Table III of the appendix.

Block 43 on FIG. 13 indicates the higher level data grouping which represents the entirety of the data required to define mortgage pool issues (like Ginnie Maes, Freddie Macs, and so on) including current paydown factors. Notice that mortgage pool issues are a specialized type of interest bearing debt issue. This view can be used as a unit for the purposes of data entry and data retrieval. The keys to the view are a combination of the keys to all of the included tables. An illustrative view definition is shown at Label 51 in Table III of the appendix.

Block 44 on FIG. 13 indicates the higher level data grouping which represents the entirety of the data required to report on put and call schedules for interest bearing bonds with contingent claim options (bonds like municipal bonds, corporate bonds, and so on). Note that higher organizations can be created without using every intermediate level of the hierarchy. As with all previous views, this view can be used as a unit for the purposes of data entry and data retrieval. The keys to the view are a combination of the keys to all of the included tables. An illustrative view definition is shown at Label 52 in Table III of the appendix.

Block 45 on FIG. 14 indicates the higher level data grouping which represents the entirety of the data required to define the purchase of a discount issue (like treasury bills, discount certificates of deposit, and so on). Note that the instrument hierarchy navigation data fields are required to define this transaction view. This is represented by a stack of rounded boxes on the diagram. Note also that the purchase of an instrument creates a position as well as a transaction. This view can be used as a unit for the purposes of data entry and data retrieval. The keys to the view are a combination of the keys to all of the included tables. An illustrative view definition is shown at Label 53 in Table IV of the appendix.

Block 46 on FIG. 14 indicates the higher level data grouping which represents the entirety of the data required to define the purchase of a mortgage pool issue (like Ginnie Maes, Freddie Macs, and so on). Note the use of stacked rounded boxes to represent access to the hierarchy navigation data fields of the instrument data base. Note also that the purchase of an instrument creates a position as well as a transaction. This view can be used as a unit for the purposes of data entry and data retrieval. The keys to the view are a combination of the keys to all of the included tables. An illustrative view definition is shown at Label 54 of Table IV of the appendix.

Block 47 on FIG. 14 indicates the higher level data grouping which represents the entirety of the data required to define the purchase of a discount issue denominated in a foreign currency (like a Canadian treasury bill, a discount certificate of deposit from a German bank, and so on). Note the use of stacked rounded boxes to represent access to the hierarchy navigation data fields of the instrument data base. Note also that the purchase of an instrument creates a position as well as a transaction. This view can be used as a unit for the purposes of data entry and data retrieval. The keys to the view are a combination of the keys to all of the included tables. An illustrative view definition is shown at Label 55 in Table IV of the appendix.

Block 48 on FIG. 14 indicates the higher level data grouping which represents the entirety of the data required to define the sale of a discount issue (like treasury bills, discount certificates of deposit, and so on). Note the use of stacked rounded boxes to represent access to the hierarchy navigation data fields of the instrument data base. Note also that the sale of an instrument effects the position as well as creating a new transaction. This view can be used as a unit for the purposes of data entry and data retrieval. The keys to the view are a combination of the keys to all of the included tables. An illustrative view definition is shown at Label 56 in Table IV of the appendix.

Tables V and VI represent program listings of some simple reports which utilize the diagramed in FIGS. 13 and 14.

While all of these figures use portfolio management system requirements for the purposes of illustration, there are many other types of computer systems in this industry (as was mentioned above). It should be understood that this storage method is useful in any of these application areas simply by the addition or the removal of tables. For example, bond only portfolios would not need any of the stock tables. Heavily traded stock portfolios might require some additional tables. Options and futures can also be handled in this way by the addition of one or more tables (the actual tables to add would depend on the requirements of the application). In order to determine the nature of the tables to be added or deleted, the normalization process (described in the previous section) would be applied to the data.

Changes to the data content of the system (that is, addition and deletion of tables) will, of necessity, be made by different programmers at different times depending on the goal of the development process. However, addition or deletion of tables in no way departs from the novel underlying process of organizing the storage and retrieval process by attribute group nor does it depart from the valuable process of storing and retrieving transaction and position data in a common structure.

The invention also anticipates that creation of and/or management of these views can be automated by software which understands the relationships between the tables based on the hierarchy navigation fields added to the data base at each branch point. These relationships can be simply and clearly stated in a manner which is amenable to storage in a "rules" data base. This rules data base could be queried to aid or automate the creation and management of the data entry and retrieval views described here.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

APPENDIX

Description of the Tables

Table I is the listing of a program which creates the data base shown in FIG. 9.

Table II is the listing of a program which creates the data base shown in FIG. 10.

Table III is the listing of a program which creates the higher organizations shown in FIG. 12.

Table IV is the listing of a program which creates the higher organizations shown in FIG. 13.

Table V is the listing of a program which extracts and displays currently stored data according to the higher organization of FIG. 12.

Table VI is the listing of a program which extracts and displays currently stored data according to the higher organization of FIG. 13.

APPENDIX

```
rem
rem ************************************
rem          TABLE I
rem ************************************
rem
rem File: mkinstdb.sql
rem
rem This file contains all of the commands
rem necessary to delete and recreate the
```

```
rem instrument data base.
rem
rem ************************************
rem Drop Pre-existing Tables
rem ************************************
rem
drop table instrument;
drop table debt;
drop table interest_bearing;
drop table contingent_claims;
drop table asset_backed;
drop table paydown_factor;
drop table equity;
drop table preferred_stock;
rem
rem ************************************
rem Instrument Data Base - Base Table    * - 21
rem ************************************
rem This table contains items which are common
rem to all investment instruments. The key to
rem to this table (and all other tables in the
rem instrument data base) is the instrument ID.
rem
create table instrument
    (id           number(10)  not null /* Counting number */
    ,issuer       char(8)     not null /* USA, FORD, etc. */
    ,description  char(40)    not null /* Text for reports */
    ,type         char(8)     not null /* Debt, Equity, etc. */
    );
create unique index instrument_id on instrument (id);
rem
rem ************************************
rem Debt Table                            * - 22
rem ************************************
rem This table contains items which are common
rem to all debt instruments. Instrument type
rem code defines characteristics of instrument.
rem
create table debt
    (id            number(10)  not null /* Matches in instrument table */
    ,code          char(8)     not null /* TBIL, GNMA, etc. */
    ,issue_date    date        not null /* Past or future */
    ,maturity_date date        not null /* Not put, call, or avg life */
    ,type          char(8)     not null /* Discount, Int. bearing, etc. */
    );
create unique index debt_id on debt (id);
rem
rem ************************************
rem Interest Bearing Debt Table           * - 23
rem ************************************
rem This table contains items which are common
rem to all interest bearing debt instruments.
rem Instrument type code defines characteristics
rem of instrument.
rem
create table interest_bearing
    (id                number(10)  not null /* Matches in instrument table */
    ,prior_payment_date date       not null /* Last one or issue date */
    ,next_payment_date  date       not null /* Next one or maturity */
    ,interest_rate      number(9,6) not null /* 6.0, 10.5, etc. */
    ,interest_calc_code number(2)  not null /* 30/360, actual days, etc. */
    ,options            char(8)    not null /* Contingent claims, etc. */
    );
create unique index interest_bearing_id on interest_bearing (id);
rem
rem ************************************
rem Contingent Claims Table               * - 24
rem ************************************
rem This table contains put and call dates
rem for all debt instruments with contingent
rem redemption options. Instrument type code
rem defines characteristics of instrument.
rem
create table contingent_claims
    (id               number(10)  not null /* Matches in instrument table */
    ,redemption_date  date        not null /* Put or call date */
    ,redemption_type  char(8)     not null /* PUT or CALL */
    ,notification_date date       not null /* Last day to declare intent */
    ,redemption_price number(9,6) not null /* Put or call price */
    );
create unique index contingent_claims_id
    on contingent_claims (id,redemption_date);
rem
rem ************************************
rem Asset Backed Table                    * - 25
rem ************************************
rem This table contains descriptive items
rem which are common to all asset backed
rem debt instruments. Instrument type code
rem defines characteristics of instrument.
rem
create table asset_backed
    (id                number(10) not null /* Matches in instrument table */
    ,pool_number       number(6)           /* Optional */
    ,average_life_date date                /* Optional */
    );
create unique index asset_backed_id on asset_backed (id);
rem
rem ************************************
rem Paydown Factor History Table          * - 26
rem ************************************
rem This table contains paydown factors for
rem all asset-backed debt instruments.
rem Instrument type code defines characteristics
rem of instrument.
rem
create table paydown_factor
    (id           number(10)  not null /* Matches in instrument table */
    ,paydown_date date        not null /* Date due.*/
    ,factor       number(9,6) not null /* % pool remaining */
    );
create unique index paydown_factor_id
    on paydown_factor (id,paydown_date);
rem
rem ************************************
rem Equity Table                          * - 27
rem ************************************
rem This table contains items which are common
rem to all equity instruments. Instrument type
rem code defines characteristics of instrument.
rem
create table equity
    (id                number(10)  not null /* Matches in instrument table */
    ,ticker_symbol     char(8)     not null /* Without exchange reference */
    ,class_code        char(2)              /* A, B, etc. */
    ,exchange_code     char(2)              /* Where traded */
    ,sic_code          number(6)            /* Which industry */
    ,outstanding_shares number(12)          /* Total count */
    ,type              char(8)              /* Common, Preferred, etc. */
    );
create unique index equity_id on equity (id);
rem
rem ************************************
rem Preferred Stock Table                 * - 28
rem ************************************
rem This table contains items which are common
rem to all preferred stock equity instruments.
rem Instrument type code defines characteristics
rem of instrument.
rem
create table preferred_stock
    (id             number(10)  not null /* Matches in instrument table */
    ,effective_date date        not null /* As of date */
    ,dividend_rate  number(9,6) not null /* Fixed rate */
    );
create unique index preferred_stock_id
    on preferred_stock (id,effective_date);
commit;
```

APPENDIX

```
rem
rem ************************************
rem           TABLE II
rem ************************************
rem
rem File: mkposndb.sql
rem
rem This file contains all of the commands
rem necessary to delete and recreate the
rem transaction/position data base.
rem
rem ************************************
rem Drop Pre-existing Tables
rem ************************************
rem
drop table transaction;
drop table cash_flow;
drop table exchange_rate;
drop table position;
drop table par_amount;
drop table original_face;
drop table purchased_interest;
drop table gain_loss;
drop table interest_receipt;
drop table amortization;
drop table shares;
drop table dividend_receipt;
rem
rem ************************************
rem Transaction/Position Data Base:        * - 29
rem  Transaction Base Table                *
```

```
rem ************************************
rem This table contains items which are common
rem to all transactions. Lookups can be done
rem into this table via either the transaction
rem number or the lot number.
rem
create table transaction
    (transaction_number number(6)  not null /* Counting number */
    ,lot_number         number(6)  not null /* Which lot was effected */
    ,type               char(8)    not null /* BUY, SELL, PAYDOWN, etc. */
    ,trade_date         date       not null /* Commitment date */
    ,class              char(8)    not null /* Cash or Non-cash */
    ,effects            char(8)    not null /* Par, Shares, Face, etc. */
    );
create unique index transaction_trans_num
    on transaction (transaction_number);
create index transaction_lot_num
    on transaction (lot_number);
rem
rem ************************************
rem Cash Flow Table           * ~ 30
rem ************************************
rem This table contains items which are common
rem to all transactions which involve cash flows.
rem Lookups can be done into this table via the
rem transaction number.
rem
create table cash_flow
    (transaction_number number(6)  not null /* Index by transaction */
    ,settlement_date    date       not null /* Date of settlement */
    ,funds_transfer_date date      not null /* Date cash moves in or out */
    ,market_price       number(10,6) not null /* Format dep. on security */
    ,cash_flow_amount   number(15,2) not null /* Amount of cash moving */
    ,currency           char(8)    not null /* US, Deutchmark, etc. */
    );
create unique index cash_flow_trans_num
    on cash_flow (transaction_number);
rem
rem ************************************
rem Exchange Rate Table       * ~ 31
rem ************************************
rem This table contains items which are common
rem to all transactions which involve cash flows
rem in foreign currencies. Lookups can be done
rem into this table via the transaction number.
rem
create table exchange_rate
    (transaction_number number(6)  not null /* Index by transaction */
    ,exchange_rate      number(19,9) not null /* $ per foreign unit */
    );
create unique index exchange_rate_trans_num
    on exchange_rate (transaction_number);
rem
rem ************************************
rem Transaction/Position Data Base:  * ~ 32
rem    Position Base Table    *
rem ************************************
rem This table contains items which are common
rem to all positions. Lookups can be done
rem into this table via the transaction number.
rem
create table position
    (lot_number         number(6)  not null /* Counting number */
    ,transaction_number number(6)  not null /* of creation transaction */
    ,instrument_id      number(10) not null /* What lot is composed of */
    ,portfolio_number   number(6)  not null /* Which account is it in */
    );
create index position_lot_num
    on position (lot_number);
create unique index position_trans_num
    on position (transaction_number);
rem
rem ************************************
rem Par Amount Table          * ~ 33
rem ************************************
rem This table contains items which are common
rem to all debt positions. Lookups can be done
rem into this table via either the lot number
rem or the transaction number.
rem
create table par_amount
    (lot_number         number(6)  not null /* Index by lot */
    ,transaction_number number(6)  not null /* Index by transaction */
    ,par_amount         number(15,2) not null /* Par of transaction */
    ,running_total      number(15,2)  /* Calculated */
    );
create index par_amount_lot_num
    on par_amount (lot_number);
create unique index par_amount_trans_num
    on par_amount (transaction_number);
rem
rem ************************************
rem Original Face Amount Table   * ~ 34
rem ************************************
rem This table contains items which are common
rem to all asset backed debt positions. Lookups
rem can be done into this table via either the
rem lot number or the transaction number.
rem
create table original_face
    (lot_number         number(6)  not null /* Index by lot */
    ,transaction_number number(6)  not null /* Index by transaction */
    ,original_face      number(15,2) not null /* Replaces par in trans. */
    ,paydown_factor     number(9,6) not null /* Factor assoc. with trans. */
    );
create index original_face_lot_num
    on original_face (lot_number);
create unique index original_face_trans_num
    on original_face (transaction_number);
rem
rem ************************************
rem Purchased Interest Amount Table  * ~ 35
rem ************************************
rem This table contains items which are common
rem to interest bearing debt positions. Lookups
rem can be done into this table via either the
rem lot number or the transaction number.
rem
create table purchased_interest
    (lot_number         number(6)  not null /* Index by lot */
    ,transaction_number number(6)  not null /* Index by transaction */
    ,purchased_interest number(15,2) not null /* Interest amount */
    ,running_total      number(15,2) not null /* Calculated */
    );
create index purchased_interest_lot_num
    on purchased_interest (lot_number);
create unique index purchased_interest_trans_num
    on purchased_interest (transaction_number);
rem
rem ************************************
rem Interest Receipt Amount Table  * ~ 36
rem ************************************
rem This table contains items which are common
rem to all interest bearing debt positions.
rem Lookups can be done into this table via
rem either the lot number or the transaction
rem number.
rem
create table interest_receipt
    (lot_number         number(6)  not null /* Index by lot */
    ,transaction_number number(6)  not null /* Index by transaction */
    ,interest_receipt   number(15,2) not null /* Amount of interest rec'd. */
    ,earned             number(15,2)  /* Calculated */
    ,running_total      number(15,2)  /* of earnings */
    );
create index interest_receipt_lot_num
    on interest_receipt (lot_number);
create unique index interest_receipt_trans_num
    on interest_receipt (transaction_number);
rem
rem ************************************
rem Realized Gain/Loss Table     * ~ 37
rem ************************************
rem This table contains items which are common
rem to all transactions which involve capital
rem gains and losses. Lookups can be done into
rem this table via either the lot number or
rem the transaction number.
rem
create table gain_loss
    (lot_number         number(6)  not null /* Index by lot */
    ,transaction_number number(6)  not null /* Index by transaction */
    ,amount_realized    number(15,2) not null /* Amount of gain/loss */
    ,running_total      number(15,2)  /* Calculated */
    );
create index gain_loss_lot_num
    on gain_loss (lot_number);
create unique index gain_loss_trans_num
    on gain_loss (transaction_number);
rem
rem ************************************
rem Cost Basis Table            * ~ 38
rem ************************************
rem This table contains items which are common
rem to all debt positions. Lookups can be done
rem into this table via either the lot number
rem or the transaction number.
rem
create table cost_basis
    (lot_number         number(6)  not null /* Index by lot */
    ,transaction_number number(6)  not null /* Index by transaction */
    ,amortization_amount number(15,2) not null /* Change in cost basis */
    ,new_cost_basis     number(15,2)  /* Calculated */
    );
```

```
create index amortization_lot_num
    on amortization (lot_number);
create unique index amortization_trans_num
    on amortization (transaction_number);
rem
rem ******************************************
rem Number of Shares Table          * ~ 39
rem ******************************************
rem This table contains items which are common
rem to all equity positions. Lookups can be done
rem into this table via either the lot number
rem or the transaction number.
rem
create table shares
    (lot_number        number(6)  not null /* Index by lot */
    ,transaction_number number(6)  not null /* Index by transaction */
    ,shares            number(19,6) not null /* Shares in transaction */
    ,running_total     number(15,2)    /* Calculated */
    );
create index shares_lot_num
    on shares (lot_number);
create unique index shares_trans_num
    on shares (transaction_number);
rem
rem ******************************************
rem Dividend Receipt Amount Table   * ~ 40
rem ******************************************
rem This table contains items which are common
rem to all equity positions. Lookups can be
rem done into this table via either the lot
rem number or the transaction number.
rem
create table dividend_receipt
    (lot_number        number(6)  not null /* Index by lot */
    ,transaction_number number(6)  not null /* Index by transaction */
    ,dividend_receipt  number(15,2) not null /* Amount of dividend rec'd. */
    ,running_total     number(15,2)    /* Calculated */
    );
create index dividend_receipt_lot_num
    on dividend_receipt (lot_number);
create unique index dividend_receipt_trans_num
    on dividend_receipt (transaction_number);
commit;

APPENDIX rem
rem ******************************************
rem           TABLE III
rem ******************************************
rem
rem File: mkinstvw.sql
rem
rem This file contains all of the commands
rem necessary to delete and recreate some
rem typical instrument data base views.
rem
rem ******************************************
rem Drop Pre-existing Views
rem ******************************************
rem
drop view discount_issue;
drop view interest_bearing_issue;
drop view asset_backed_factors;
drop view contingent_claims_schedule;
rem
rem ******************************************
rem Discount Instrument View         * ~ 49
rem ******************************************
rem This view combines all of the instrument
rem data base tables which contain data about
rem discount issues.
rem
create view discount_issue as
    select i.id,i.type,i.issuer,i.description,
        d.issue_date,d.maturity_date
        from instrument i,debt d
        where i.type = 'DEBT'
        and d.type = 'DISC'
        and i.id = d.id;
rem
rem ******************************************
rem Interest Bearing Instrument View * ~ 50
rem ******************************************
rem This view combines all of the instrument
rem data base tables which contain data about
rem simple interest bearing issues.
rem
create view interest_bearing_issue as
    select i.id,i.type,i.issuer,i.description,
        d.issue_date,d.maturity_date,
        b.interest_calc_code,b.prior_payment_date,
        b.next_payment_date,b.interest_rate
        from instrument i,debt d,interest_bearing b
        where i.type = 'DEBT'
        and d.type = 'INT'
        and b.options = 'NONE'
        and i.id = d.id
        and i.id = b.id;
rem
rem ******************************************
rem Asset Backed Instrument View     * ~ 51
rem ******************************************
rem This view combines general information
rem from all of the instrument data base
rem tables which contain data about mort-
rem gages including their paydown factors.
rem
create view asset_backed_factors as
    select i.id,i.type,i.issuer,i.description,
        d.issue_date,d.maturity_date,
        b.interest_rate,
        a.pool_number,a.average_life_date,
        p.paydown_date,p.factor
        from instrument i,debt d,interest_bearing b,asset_backed a,
            paydown_factor p
        where i.type = 'DEBT'
        and d.type = 'INT'
        and b.options = 'MORT'
        and i.id = d.id
        and i.id = b.id
        and i.id = a.id
        and i.id = p.id;
rem
rem ******************************************
rem Contingent Claims Schedule View  * ~ 52
rem ******************************************
rem This view combines all of the instrument
rem data base tables which contain data about
rem contingent claims schedules.
rem
create view contingent_claims_schedule as
    select i.id,i.type,i.issuer,i.description,
        c.redemption_date,c.redemption_type,c.notification_date,
        c.redemption_price
        from instrument i,contingent_claims c
        where i.id = c.id;
rem
commit;

APPENDIX rem
rem ******************************************
rem           TABLE IV
rem ******************************************
rem
rem File: mkposnvw.sql
rem
rem This file contains all of the commands
rem necessary to delete and recreate some
rem typical transaction/position data base
rem views.
rem
rem ******************************************
rem Drop Pre-existing Views
rem ******************************************
rem
drop view discount_buy;
drop view mortgage_buy;
drop view foreign_discount_buy;
drop view discount_sell;
rem
rem ******************************************
rem Discount Issue Purchase View     * ~ 53
rem ******************************************
rem This view combines all of the instrument
rem data base tables which contain data about
rem the purchase of discount issues.
rem
create view discount_buy as
    select t.transaction_number,t.type,t.trade_date,
        c.settlement_date,c.funds_transfer_date,
        c.market_price,c.cash_flow_amount,
        p.lot_number,p.instrument_id,p.portfolio_number,
        a.par_amount
        from transaction t,cash_flow c,position p,par_amount a,
            instrument i,debt d
        where t.type = 'BUY'
        and t.transaction_number = p.transaction_number
        and t.transaction_number = c.transaction_number
        and t.transaction_number = a.transaction_number
        and p.instrument_id = i.id
```

```
        and i.type = 'DEBT'
        and d.type = 'DISC'
        and i.id = d.id;
rem
rem ****************************************
rem Mortgage Pool Purchase View    * ~ 54
rem ****************************************
rem This view combines all of the instrument
rem data base tables which contain data about
rem the purchase of a GNMA pool.
rem
create view mortgage_buy as
    select t.transaction_number,t.type,t.trade_date,
        c.settlement_date,c.funds_transfer_date,
        c.market_price,c.cash_flow_amount,
        p.lot_number,p.instrument_id,p.portfolio_number,
        a.par_amount,
        f.original_face,f.paydown_factor,
        x.purchased_interest
    from transaction t,cash_flow c,position p,par_amount a,
        original_face f,purchased_interest x,
        instrument i,debt d,interest_bearing b
    where t.type = 'BUY'
        and t.transaction_number = p.transaction_number
        and t.transaction_number = c.transaction_number
        and t.transaction_number = a.transaction_number
        and t.transaction_number = f.transaction_number
        and t.transaction_number = x.transaction_number
        and p.instrument_id = i.id
        and i.type = 'DEBT'
        and d.type = 'INT'
        and b.options = 'MORT'
        and i.id = d.id
        and i.id = b.id;
rem
rem ****************************************
rem Foreign Discount Issue Purchase View * ~ 55
rem ****************************************
rem This view combines all of the instrument
rem data base tables which contain data about
rem the purchase of foreign discount issues.
rem
create view foreign_discount_buy as
    select t.transaction_number,t.type,t.trade_date,
        c.settlement_date,c.funds_transfer_date,
        c.market_price,c.cash_flow_amount,
        e.exchange_rate,
        p.lot_number,p.instrument_id,p.portfolio_number,
        a.par_amount
    from transaction t,cash_flow c,exchange_rate e,
        position p,par_amount a,
        instrument i,debt d
    where t.type = 'BUY'
        and c.currency <> 'US$'
        and t.transaction_number = p.transaction_number
        and t.transaction_number = c.transaction_number
        and t.transaction_number = e.transaction_number
        and t.transaction_number = a.transaction_number
        and p.instrument_id = i.id
        and i.type = 'DEBT'
        and d.type = 'DISC'
        and i.id = d.id;
rem
rem ****************************************
rem Discount Issue Sale View    * ~ 56
rem ****************************************
rem This view combines all of the instrument
rem data base tables which contain data about
rem the sale of discount issues.
rem
create view discount_sell as
    select t.transaction_number,t.type,t.trade_date,
        c.settlement_date,c.funds_transfer_date,
        c.market_price,c.cash_flow_amount,
        p.lot_number,p.instrument_id,p.portfolio_number,
        a.par_amount,
        g.amount_realized
    from transaction t,cash_flow c,position p,
        par_amount a,gain_loss g,
        instrument i,debt d
    where t.type = 'SELL'
        and t.transaction_number = p.transaction_number
        and t.transaction_number = c.transaction_number
        and t.transaction_number = a.transaction_number
        and t.transaction_number = g.transaction_number
        and p.instrument_id = i.id
        and i.type = 'DEBT'
        and d.type = 'DISC'
        and i.id = d.id;
rem
commit;
```

APPENDIX

```
rem
rem ****************************************
rem           TABLE V
rem ****************************************
rem
rem File: ldinstvw.sql
rem
rem This file contains all of the commands
rem to test the views for validity.
rem
rem ****************************************
rem Discount Instrument View
rem ****************************************
select id,description,maturity_date
    from discount_issue;
rem
rem ****************************************
rem Interest Bearing Instrument View
rem ****************************************
select id,description,maturity_date,interest_rate
    from interest_bearing_issue;
rem
rem ****************************************
rem Asset Backed Instrument View
rem ****************************************
select id,paydown_date,factor,pool_number,issue_date
    from asset_backed_factors
    order by id,paydown_date;
rem
rem ****************************************
rem Contingent Claims Schedule View
rem ****************************************
select id,notification_date,redemption_date,redemption_type
    from contingent_claims_schedule
    order by id,notification_date;
```

APPENDIX

```
rem
rem ****************************************
rem           TABLE VI
rem ****************************************
rem
rem File: ldposnvw.sql
rem
rem This file contains all of the commands
rem to test the views for validity.
rem
rem ****************************************
rem Discount Issue Purchase View
rem ****************************************
select transaction_number,t.type,trade_date,settlement_date
    par_amount,market_price,i.description
    from discount_buy t,instrument i
    where i.id = t.instrument_id;
rem
rem ****************************************
rem Mortgage Pool Purchase View
rem ****************************************
select transaction_number,t.type,trade_date,
    par_amount,original_face,paydown_factor,i.description
    from mortgage_buy t,instrument i
    where i.id = t.instrument_id;
rem
rem ****************************************
rem Foreign Discount Issue Purchase View
rem ****************************************
select transaction_number,t.type,trade_date,
    par_amount,market_price,exchange_rate,i.description
    from foreign_discount_buy t,instrument i
    where i.id = t.instrument_id;
rem
rem ****************************************
rem Discount Issue Sale View
rem ****************************************
select transaction_number,t.type,trade_date,
    par_amount,market_price,amount_realized,i.description
    from discount_sell t,instrument i
    where i.id = t.instrument_id;
```

I claim:

1. A data processing system that eliminates processing nulls for valueless attributes, including a digital computer having a memory and logic means for storing, processing and displaying information about a plurality of investment vehicles of diverse types, including transaction and position data related thereto, the combination comprising:

means for input of data identifying a specific type of investment vehicle;

means for input of attribute data normally associated with said vehicle type;

means for assigning an identification code to said vehicle type;

means for associating said code and said input attribute data with one or more of a plurality of preestablished functional groups of attribute data;

means for storing said input attribute data in association with selected ones of said functional groups;

means for subsequent retrieval of said input attribute data for said identified vehicle type through use of functional groups.

2. The system of claim 1 further comprising:

location key means for associating said identification code with specific attributes in said functional groups of attribute data.

3. The system of claim 2 wherein said location key means includes means for indexing said identification code with memory locations of attribute data stored in said functional groups.

4. The system of claim 3 further comprising:

means for input of values associated with said input attribute data;

and means for storing said values in memory locations associated with said functional groups.

5. The system of claim 4 further comprising:

means for retrieving said stored attribute values through use of said means for indexing.

6. The system of claim 3 further comprising:

means for input of attribute values associated with said input attribute data;

and means for storing said values in memory locations associated with said functional groups.

7. The system of claim 6 further comprising:

means for retrieving said stored attribute values through use of said means for indexing.

* * * * *